United States Patent [19]

Meland

[11] Patent Number: 4,673,028

[45] Date of Patent: Jun. 16, 1987

[54] AUTOMATIC THERMOSTATIC CONTROL SYSTEM FOR HEATER AND EVAPORATIVE COOLER

[76] Inventor: Bruce C. Meland, 14712 Otsego St., Sherman Oaks, Calif. 91403

[21] Appl. No.: 766,543

[22] Filed: Aug. 19, 1985

[51] Int. Cl.⁴ .......................... F24F 3/14; F28D 3/00
[52] U.S. Cl. ...................................... 165/19; 165/60; 62/171
[58] Field of Search .............. 62/171, 176.4; 236/44 R, 44 B, 68 B; 165/19, 26, 27, 60

[56] References Cited

U.S. PATENT DOCUMENTS

| | | | |
|---|---|---|---|
| 1,933,330 | 10/1933 | Johnson | 165/60 |
| 2,120,299 | 6/1938 | Stramaglia | 62/179 |
| 3,587,558 | 6/1971 | Raleigh | 165/26 |
| 3,906,253 | 9/1975 | Farley | 236/68 B |
| 3,993,120 | 11/1976 | Iberg et al. | 165/26 |
| 4,083,397 | 4/1978 | Kimpel et al. | 165/26 |
| 4,232,531 | 11/1980 | Mangam, Jr. et al. | 62/171 |
| 4,270,597 | 6/1981 | Denny | 165/27 |
| 4,535,601 | 8/1985 | Newell, Jr. et al. | 62/171 |
| 4,552,303 | 11/1985 | Fisher et al. | 62/171 |
| 4,580,403 | 4/1986 | Hummel | 62/171 |

Primary Examiner—Albert W. Davis, Jr.
Assistant Examiner—John K. Ford
Attorney, Agent, or Firm—Keith D. Beecher

[57] ABSTRACT

An automatic thermostatic control system for a heater and an evaporative cooler which turns the cooler on only when needed, which automatically switches the blower of the cooler between low and high speeds as required so as to maintain essentially constant temperature, and which provides automatic change-over from a cooling to a heating condition.

2 Claims, 1 Drawing Figure

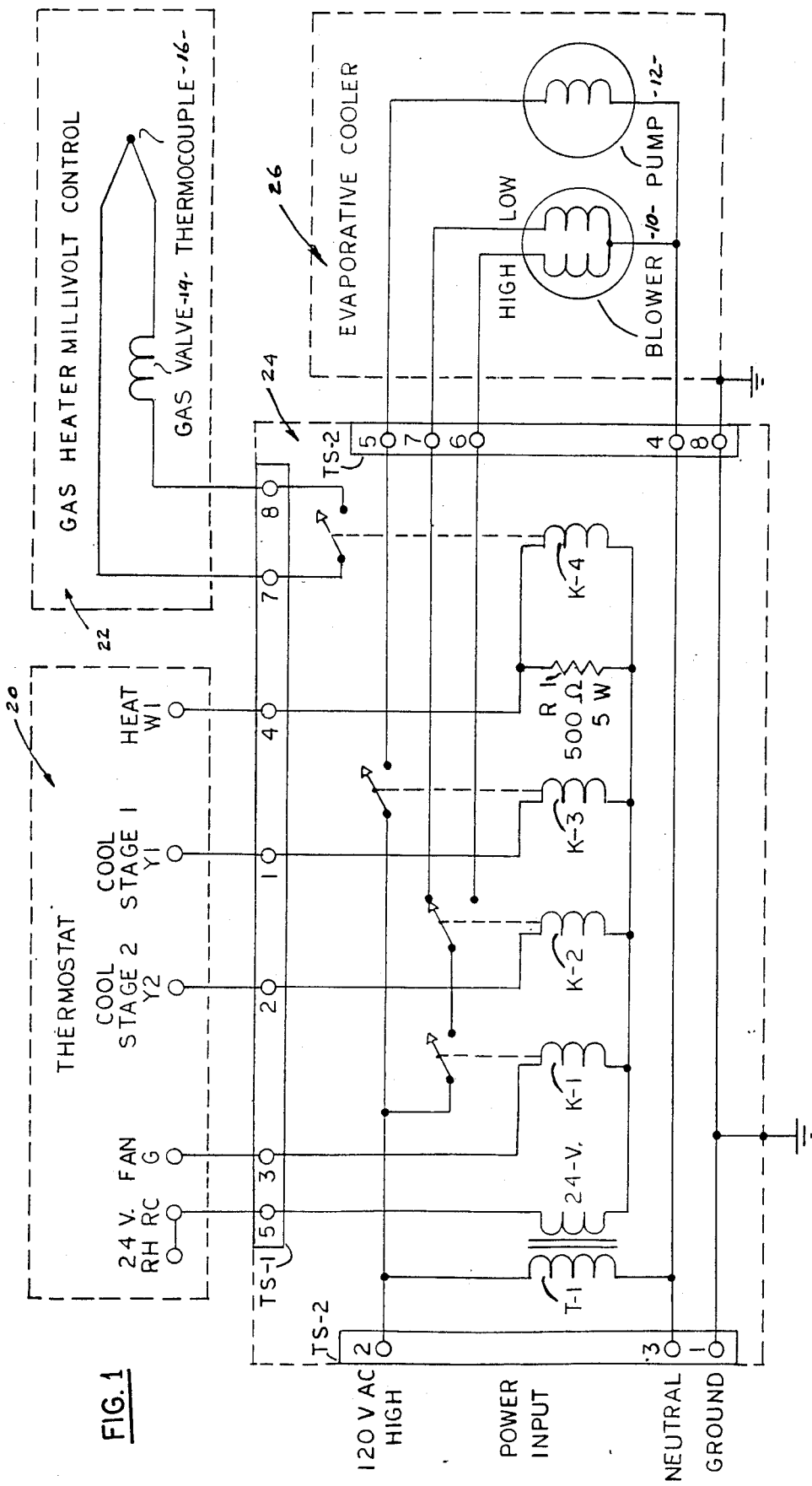

AUTOMATIC THERMOSTATIC CONTROL SYSTEM FOR HEATER AND EVAPORATIVE COOLER

BACKGROUND OF THE INVENTION

Evaporative coolers represent an effective and econonomical means for cooling homes in areas of low humidity, and they are becoming even more practical with the increasing costs of electric power. In the past, however, evaporative coolers had several objectionable characteristics. An objective of the present invention is to overcome these objectionable characteristics.

A major problem with evaporative coolers in the past has been that it was considered impractical to contrbl them with a thermostat, and the coolers were usually turned on and off by means of a manually operated switch. Accordingly, it was necessary for the user constantly to turn the cooler on or off, usually in an unsuccessful attempt to maintain a desirable temperature.

The system of the present invention makes it possible to control an evaporative cooler with a precision thermostat. In addition, the same thermostat is used to control a gas heater, or the like. Thus, the thermostat is set to a desired temperature, and the system of the invention takes over and automatically and accurately maintains the set temperature for summer or winter.

The system of the invention includes the following advantages: the evaporative cooler is turned on only when it is needed; the blower of the cooler is automatically switched between low and high speeds, as needed in order to maintain a constant temperature; the system is easily adapted to an existing cooler and heating system, as well as to new installations; and the system provides automatic change-over from cooling to heating.

In addition, the system of the invention renders it impossible for the cooler and heater to be on at the same time, thereby eliminating a source of wasted energy. The system also saves energy because the evaporative cooler is activated only when it is needed.

It has been the usual practice in the past to leave one or more windows open so as to allow the air from the evaporative cooler to escape. Thermostatic control of evaporative coolers under such conditions is not practical, because as soon as the cooler is turned off, hot outside air rapidly enters the house through the open windows. This produces rapid cycling of the cooler thereby defeating the purpose of the thermostat.

The thermostatic control system of the present invention is intended to be used in conjunction with an air shutter installed in the ceiling of the room which opens automatically when the cooler is operating due to the increased air pressure from the blower of the cooler, and which closes when the cooler is turned off. The windows may now be closed, and air is vented through the shutter into the attic and out the attic vent.

BRIEF DESCRIPTION OF THE DRAWING

FIG. 1 is a schematic representation of the control system of the present invention in its presently preferred embodiment.

DETAILED DESCRIPTION OF THE ILLUSTRATED EMBODIMENT

The control system shown in FIG. 1 includes a terminal strip designated TS-1, and a second terminal strip designated TS-2. The terminals 1, 2 and 3 of terminal strip TS-2 may be connected across a 120-volt alternating current power source. Terminal 1 of terminal strip TS-2 is grounded, and the primary winding of a transformer T-1 is connected across terminals 2 and 3. Transformer T-1 serves to step down the voltage from the 120-volt source to 24-volts for operation of a series of relays designated K-1, K-2 and K-3. Relays K-1 and K-3 each has a common terminal and normally open contacts, and relay K-2 has a common terminal and normally closed contacts.

The common terminal and the normally open set of contacts or relay K-1 connect terminal 2 of terminal strip TS-2 to terminal 7 through the common terminal and normally closed contacts of relay K-2, and to terminal through the common terminal and normally open contacts of relay K-2. Terminal 2 of terminal strip TS-2 is connected through the common terminal and normally open contacts of relay K-3 to terminal 5. The control system of the invention which contains the relays K-1, K-2 and K-3 is designated generally as 24.

Terminal 5 of terminal strip TS-2 is connected to the water pump 12 of an evaporative cooler 26, and terminals 6 and are connected to the high and low drives of a blower 10. Both the blower 10 and water pump 12 are connected back to neutral terminal 3 through terminal 4. The chassis of control system 24 and of evaporative cooler 26 are grounded by connection to ground terminal 1 through terminal 8. The evaporative cooler 26 may be any appropriate cooler which is presently available on the market.

A thermostat 20 is provided, and it is preferably a precision thermostat which, likewise, may be of any appropriate type presently available on the market. The thermostat serves to connect contacts RH, RC, to contacts G, Y2, Y1 and W1 as a function of a temperature set by the thermostat.

Terminals RH, RC are connected to terminal 5 of terminal strip TS-1 which, in turn, is connected to one side of the secondary of transformer T-1. The relay coils K-1, K-2 and K-3 are connected to the other side of the secondary, as is relay coil K-4 and a 500 ohm 5 watt resistor Rl. The relay coils K-1, K-2, K-3 and K-4 are respectively connected to thermostat terminals G, Y2, Y1 and W1 through terminals 3, 2, 1 and 4 of terminal strip TS-1. Resistor Rl is connected across the coil of relay K-4.

Terminals 7 and 8 of terminal strip TS-1 are shunted by the common terminal and normally open contacts of relay K-4, and terminals 7 and 8 are connected to a gas heater millivolt control 22 which contains the control coil 14 of a gas valve and a thermocouple 16. Whenever relay K-4 closes its contacts, a circuit is completed from thermocouple 16 to the operating coil of gas valve 14 to turn on the heater.

Assuming now that the thermostat 20 has been set to 72° F. If the temperature should drop below 72° F., circuitry in the thermostat causes power to be supplied to relay K-4 and resistor R1. Relay K-4 then closes and completes the circuit to the millivolt gas valve in heater control 16. The valve then opens and the heater turns on.

Resistor R1 is connected in parallel with the coil of relay K-4 because this coil does not draw sufficient current to enable the heat anticipator circuit in the thermostat 20 to function properly. Resistor Rl draws additional current to accomplish this function.

When the room heats up and the temperature rises above 72° F., the thermostat 20 removes power from relay K-4 and its contacts open, thereby removing power from the gas valve. The gas valve now closes and the heater turns off.

If the temperature should rise further above 72° F., the thermostat 20 will simultaneously cause power to be applied to relays K-1 and K-3. Relay K-1 closes its contacts and applies the line voltage through the normally closed contact of relay K-2 to energize the low speed winding of the blower motor 10 in the evaporative cooler. This causes the blower to run at low speed. Relay K-3 closes its contacts at the same time as relay K-1, and causes the 120-volt alternating current line voltage to be applied to the water pump 12 in the evaporative cooler. The water pump circulates water through the evaporator pads of the cooler, and cooling action begins almost immediately.

On an extremely hot day, the low speed of the blower 10 may not provide enough cooling to maintain a temperature of 72° F. Accordingly, should the temperature rise above 74° F., the thermostat will cause power to be applied to relay K-2. Relay K-2 now closes its normally open contacts to cause power to be applied to the hiqh speed winding of the motor of blower 10. The resulting higher air velocity and volume provides increased cooling action.

When the temperature decreases back to 72° F., the thermostat 20 causes power to be removed from the relay K-2, switching the blower speed back to low speed. If the temperature continues to drop and goes below 72° F., the thermomostat 20 removes power from both relays K-1 and K-3. The blower and water pump now both stop running. Accordingly, the cooler and/or heater continue to cycle on and off as required to maintain a constant temperature of 72° F.

Thermostat 20 may have a manually controlled fan switch (not shown) which, when placed to the "on" position, causes power to be supplied only to relay K-1 through terminal G. This causes the blower to be energized at low speed. Relay K-3 is not energized under these conditions, so that the water pump 12 is not activated. Operation of this switch permits the circulation of fresh air through the house without the cooling function.

The invention provides, therefore, an improved system for controlling a heater and an evaporative cooler on an automatic basis, so that the single setting of a thermostat provides for uniform temperature within a house, regardless of the external temperature.

It will be appreciated that while a particular embodiment of the invention has been shown and described, modifications may be made. It is intended in the claims to cover all modifications which come within the true spirit and scope of the invention.

I claim:

1. An automatic control system for an evaporative cooler and an electrically-controlled heater, said cooler including an electrically driven water pump, and an electrically driven blower having a high speed winding and a low speed winding, said control system comprising; first, second, third and fourth relays, each having a winding, and each of the relays having a common terminal and normally open contacts, and the second of the relays further having normally closed contacts, the normally open contacts of the first relay being connected to the common terminal of the second relay and the normally open and normally closed contacts of the second relay being connected respectively to the high speed and low speed winding of the blower, and the normally open contacts of the third relay being connected to the water pump; and thermostatic control means connected to the windings of the four relays for causing the first and third relays to close their normally open contacts when ambient temperature reaches a pre-set threshold, for causing the second relay to open its normally closed contacts and close its normally open contacts when ambient temperature exceeds the pre-set threshold by a predetermined amount, and for automatically causing the fourth relay to close its normally open contacts and to activate the heater when ambient temperature falls below a pre-set threshold.

2. The automatic control system defined in claim 1, in which said heater is a gas heater controlled by an electrically operated valve, and in which the normally open contacts of the fourth relay, when closed, complete an electric circuit to the electrically operated valve.

* * * * *